United States Patent [19]

Haines et al.

[11] Patent Number: 4,880,320

[45] Date of Patent: Nov. 14, 1989

[54] FLUID FILM JOURNAL BEARINGS

[75] Inventors: Derrick J. Haines, Hatfield; Harry Marsh, Durham City, both of England

[73] Assignee: British Aerospace plc, London, England

[21] Appl. No.: 166,372

[22] Filed: Mar. 10, 1988

[30] Foreign Application Priority Data

Mar. 10, 1987 [GB] United Kingdom ................. 8705644
Jun. 10, 1987 [WO] PCT Int'l Appl....PCT/GB87/00403

[51] Int. Cl.$^4$ ............................................ F16C 27/02
[52] U.S. Cl. .................................... 384/215; 384/261; 384/119
[58] Field of Search ............... 384/119, 112, 117, 222, 384/215, 295, 220, 261

[56] References Cited

U.S. PATENT DOCUMENTS

| | | | |
|---|---|---|---|
| 3,399,000 | 8/1968 | Remmers | 384/112 |
| 4,035,038 | 7/1977 | Hinchcliffe | 384/117 |
| 4,063,066 | 12/1977 | Nagoshi | 384/215 |
| 4,671,678 | 6/1987 | Münch | 384/222 |

*Primary Examiner*—Lenard A. Footland
*Attorney, Agent, or Firm*—Nixon & Vanderhye

[57] ABSTRACT

A hydrodynamic gas journal bearing system using rotating bushes which are able to radially move relative to a shaft, the movement being controlled by a spring support system, and in which a degree of dynamic imbalance of the rotating system is incorporated, these features and the design of the system being together such as to suppress the onset of self-excited instability (half-speed whirl) of the rotating system.

5 Claims, 5 Drawing Sheets

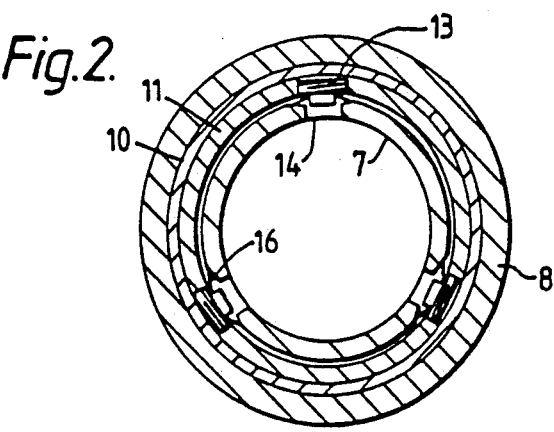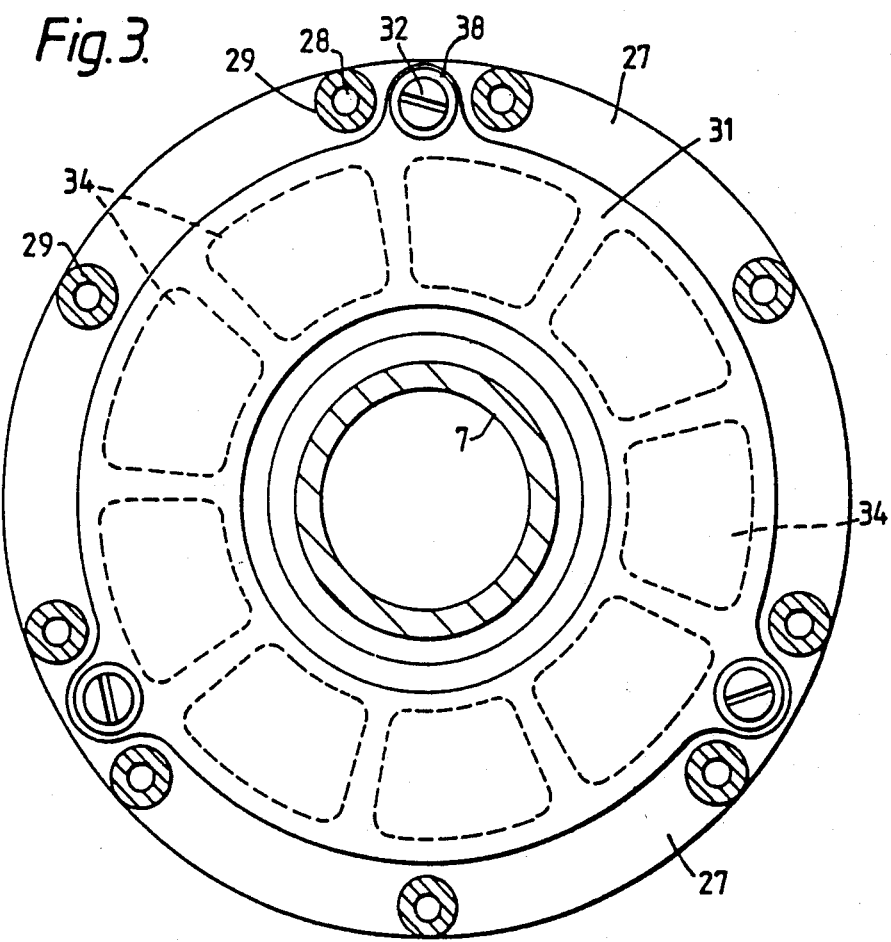

Fig.6.
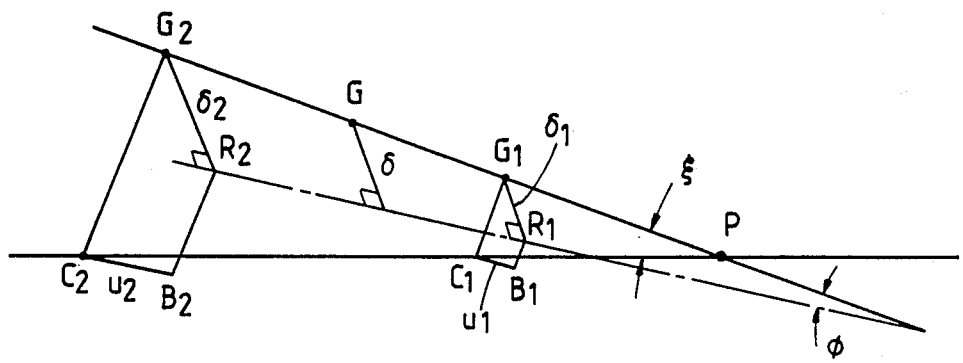
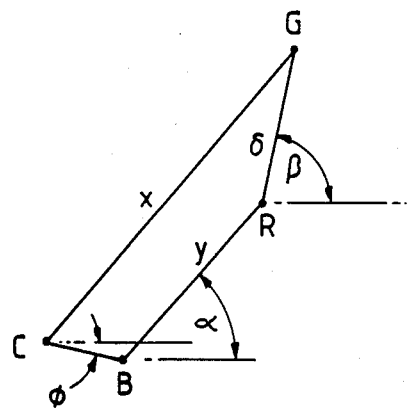
Fig.7.

FLUID FILM JOURNAL BEARINGS

This invention relates to fluid film journal bearings which radially locate a rotational member, such as a shaft, and which comprise opposed cylindrical bearing surfaces between which a fluid is entrained. The fluid may be liquid or gas (as in a hydrodynamic gas bearing).

When a balanced rotor system is supported in two plain circular journal bearings and subjected to steady loads, the system at low speeds takes up a steady state condition. As the rotor speed is increased a critical value is reached at which the system becomes unstable with the rotor centre then tracing out a small orbital motion at a frequency which is usually slightly less than one half of the rotational speed. With only a slight further increase in speed, the orbital motion grows very rapidly and the system is said to be in whirl, or in "half speed whirl", which is a state of self-excited instability.

In a system which is completely rigid, the onset of half speed whirl sets an upper limit to the region of stable operation, except that if the rotor is not perfectly balanced or the bearings are not perfectly circular, the whirl amplitudes may grow less rapidly with increased speed than previously stated. Even so, the above definition is substantially true. In systems which are not completely rigid, a further speed increase can reveal, subject to the complexity of the system tested, secondary stable operating zones of discrete definable band widths.

UK Pat. No. 1,101433 describes the whirl effect and discloses, for its alleviation, a system comprising a rotating shaft mounted in non-rotating bushes which are mounted with radial play in a fixed support structure, the play being controlled by resilient means, eg rubber O-rings, coupled between the bushes and support structure.

With this system, the amplitudes of half speed whirl are decreased to a point where in some cases it is possible to operate continuously within defined rigid system whirl zones. UK Pat. No. 2017221B discloses a modification of the above system, a rotor which is rotatably mounted on a fixed shaft by way of a journal bearing comprising an outer bearing sleeve fixed to the rotor and an inner bearing sleeve mounted on the fixed shaft with resiliently controlled radial play.

Particularly where a rotor is supported by more than one journal bearing, the system design needs to take account of linear inertias, angular inertias, linear bearing support stiffness and angular bearing support stiffness. The situation leads to a multiplicity of potential whirl states and for given rotor inertias the permissable operating speeds are defined by rotor balance state; journal bearing gas film dimension, inertia, mounting stiffness and damping. As a result it can become difficult to design a satisfactory system which will operate freely throughout a wide speed range and this invention has the object of providing a rotor/bearing assembly which is improved in this respect.

According to the invention, there is provided an assembly of a support bearing member, and a rotary system including a rotor and a rotary bearing member, the support and rotary bearing members constituting a fluid-film journal bearing for radially locating the rotor and the rotary bearing member being mounted to rotate with the rotor but with resiliently controlled radial play relative to the rotor so that there is a tendency, if rotor whirl sets in, for the relative radial positions of the rotor and rotary bearing member and hence also the dynamic balance of the rotary system to alter, the assembly being such that said tendency results in the generating of force components which act upon said system to inhibit growth of said rotor whirl.

In the accompanying drawings, which are given by way of example:

FIG. 2 is a section on the line YY in FIG. 1;

FIG. 3 is a section on the line XX in FIG. 1;

FIGS. 4 to 9 are respective diagrams for explaining the invention.

Figure 1:
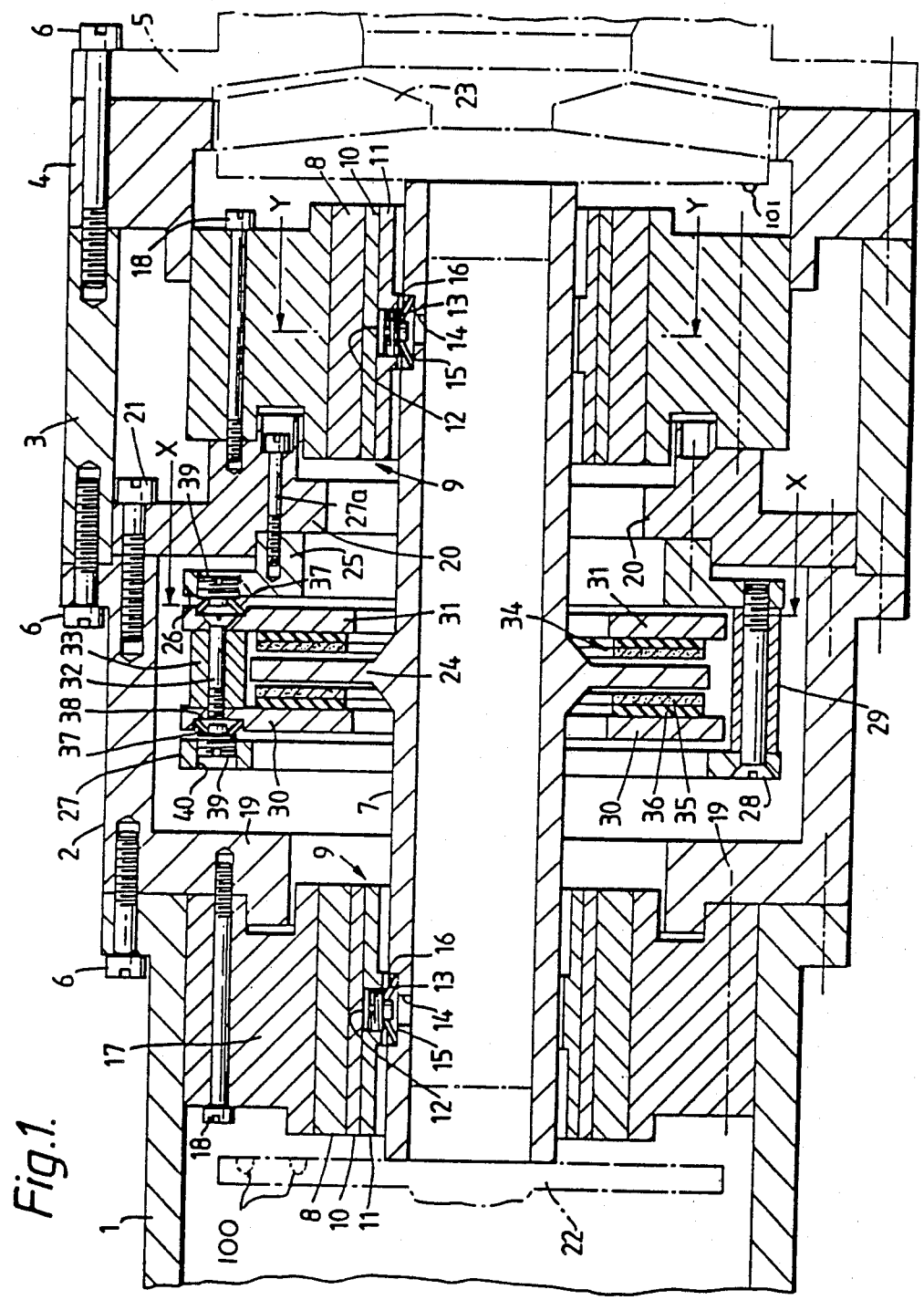
FIG. 1 is a sectional elevation of part of a turbo-compressor for supplying air to an aircraft cabin.

The illustrated turbo-compressor comprises a housing made up of four intermediate sections 1, 2, 3 and 4, an end plate 5 (only partly shown) and a further end plate which is not shown at all, the end plates and intermediate sections being secured together by bolts 6 (only some of which are shown). Within the housing, there is a hollow rotary shaft 7 supported by two hydrodynamic gas journal bearings. Each bearing consists of a fixed graphite bearing bush 8 defining an inwardly facing cylindrical bearing surface, and a rotating bearing bush 9 which comprises an outer sleeve 10 made of steel and defining an outwardly facing cylindrical bearing surface, and an inner support sleeve 11 also made of steel and onto which the outer sleeve 10 is fitted. The bush 9 is of course nested within the bush 8 so that the inwardly and outwardly facing bearing surfaces oppose one another with a degree of clearance therebetween. During use, air becomes entrained between the two bearing surfaces and supports the bush 9 for rotation within bush 8. The sleeve 11 surround shaft 7 with clearance therebetween. The central region of the inner surface of sleeve 11 has a stepped-down diameter, ie so there is less clearance (but still some) between the shaft 7 and sleeve 11 in this region. Three equi-spaced radially extending threaded holes 12 are provided in the central region of sleeve 11 and a set-screw 13 is engaged in each hole. Beneath each hole 12, a hole 14 is provided in the wall of shaft 7, each such hole being stepped out in diameter near the outer surface of the shaft to form a recess 15 for receiving a stack of disc springs 16, ie Belleville washers (shallow dish-shaped washers made of spring material). Each stack 16 is engaged between the floor of the appropriate recess 15 and the underside of the head of the appropriate set-screw 13 while the inner narrowed-down end of the set-screw protrudes through the central hole in the stack. The stacks of disc springs in the two bearings thus support the bushes 9 for resiliently controlled radial movement with respect to the shaft 7. By adjusting the positions of the set-screws 13 within their threaded holes 12, the shaft 7 can be centred within the bushes 9 and the radial stiffness of the control on the radial movement adjusted.

The fixed bush 8 of each bearing is supported within a bearing carrier member 17 fixed by bolts 18 within the housing, in one case to an inwardly extending flange 19 of the housing section 2 and, in the other case, to a shaped, generally annular, partition member 20 which is in turn fixed to the housing section 2 by bolts 21.

The two ends of the shaft 7 support a turbine impeller 22 (partly shown) and a fan 23 respectively. In use, hot compressed air from an aircraft engine may be ducted to the turbine impeller end of the housing to rotate the impeller and hence also the shaft 7 and fan 23 which then supplies cool compressed air for ventilating the aircraft cabin. The total system may also include heat exchangers, water separators and other devices to further assist in conditioning the air. Air ports, ducting and these other items are not shown.

To provide axial bearing support to the rotary system, ie the assembly of the impeller, fan, shaft, rotating bushes 9 and the set-screws and disc spring stacks which support the bushes 9 on the shaft, there is an outwardly extending annular flange 24 on shaft 7. A ring-shaped member 25 having an outwardly extending annular flange 26 is fixed by bolts 27a to the partition member 20 so that the flange 26 lies at one side of the flange 24. An annular member 27 is fixed by bolts 28 extending through spacer pillars 29 to the flange 26 so that the annular member 27 lies at the other side of the flange 24. Two further annular members 30 and 31 are positioned at respective sides of the flange 24 and between the flange 26 and annular member 27, the two further annular members being fixed together by screws 32 extending through spacer pillars 33. The two further annular members extend inwardly toward shaft 7 past the outer periphery of flange 24 so that each further annular member defines a surface which faces a respective side of the flange 24. Onto each of these surfaces are fixed a plurality of pads 34 each made up of an outer carbon bearing layer 35 on an inner layer 36 made of rubber or like resilient material, it being the inner layer 36 which, in each case, is fixed by adhesive bonding for example to the appropriate further annular member. The faces of the carbon layers thus face the sides of the flange 24 and, as known in the art, each is able to take up an 'angle of attack' (allowed by the rubber layer 36) relative to the flange 24 which ensures the formation of a wedge of air between the carbon and the flange 24, ie a hydrodynamic thrust bearing is formed. The assembly of the two further annular members, spacer pillars 33 and pads 34 is supported between the flange 26 and annular member 27 by way of stacks of disc springs 37 (Belleville washers) similar to the stacks 16. The stacks 37 are engaged between the bases of a series of locating recesses 38 provided in the outwardly facing sides of the two further annular members and the undersides of the heads of a series of set-screws 39 engaged in appropriately positioned threaded holes 40 provided in the flange and the annular member. Thus, the assembly forming the non-rotating part of the thrust bearing is able to tilt and move axially relative to the housing of the turbo-compressor, these movements being resiliently controlled by the disc spring stacks and the stiffness of the control along with the centring of the assembly with respect of the flange 24 being able to be adjusted by means of the set-screws 39.

As will be appreciated, sealing may be necessary between the various sections of the housing, for example by rubber O-rings (not shown) entrained between the sections. In addition, there may be annular sealing members (not shown) to provide isolation of the turbine and fan ends of the turbo-compressor from each other and from the radial and thrust bearings. Also, a fixed annular containment member (not shown) may be positioned around and extending inwardly at one or both sides of the thrust bearing to give additional safety containment in the face of breakages of the bearing or the shaft. Particular design details such as those mentioned above depend upon the particular application and are a matter of choice for the designer.

In fact, as will be further appreciated, the context of the illustrated rotor/bearing assembly, ie the turbo-compressor, is only ancillary to the invention which is concerned with rotor/bearing assemblies per se. However, as suggested by the given context, the invention may be of most applicability in situations where the rotor/bearing assembly is to operate over a wide range of quite high speeds.

When the rotary system, ie the shaft 7 bushes 9 and so on, is rotating at high speed, the bushes 9 will tend to dilate due to the centrifugal force acting thereon. This dilation reduces the clearance between the bushes 8 and 9. The clearance must not become zero of course and so the initial clearance, ie the initial or 'stationary' diameters of the bearing surfaces of the bushes must be chosen to allow for the likely dilation at the highest operating speed. Meanwhile, however, because the dilation effect reduces the clearance between the bearing components there is a corresponding increase in the spring stiffness of the fluid film between the two surfaces. This can cause the suppression of the onset of some whirl modes or at least raise the onset speed to a value which is outside the speed range of interest. In addition, there is a gyroscope effect acting upon the resiliently mounted bushes 9 which can also suppress certain whirl modes. It is especially advantageous in this respect to so shape the bushes 9 that they each form an element having a high polar inertia whereby the effective transverse inertia (the calculated transverse inertia $I_T$ minus twice the polar inertia $I_p$) becomes negative. This effect can be shown to suppress the onset of certain 'conical' whirl modes.

Finally, it can be shown that the illustrated bearing arrangement produces great benefit vis a vis the suppression of whirl especially when a degree of out of balance is introduced to the rotating system providing always that this out of balance does not displace the centre of gravity axis of the rotor by a distance which is greater than the radial clearance which exists between the bushes 8 and 9 at the maximum operating speed.

Figure 4:
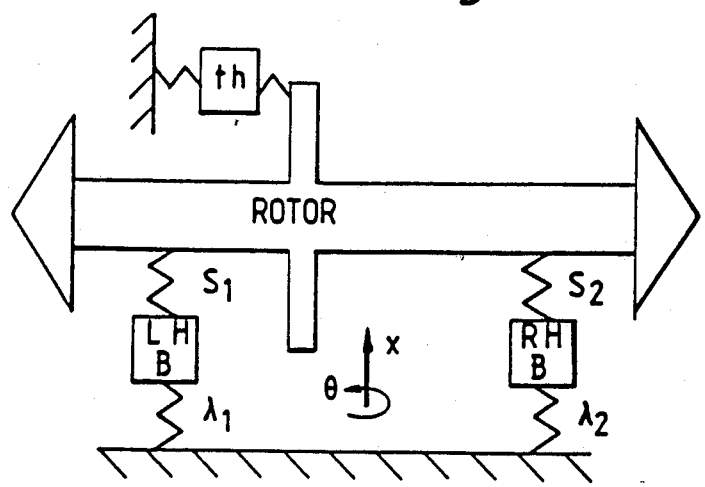

To explain this further, reference will be made to the simplified one dimensional spring analogy shown in FIG. 4. This shows the elements of the FIG. 1 apparatus in simplified form with items LHB and RHB representing the bushes 9 of the left-hand and right-hand radial bearings respectively, S1 and S2 representing the spring forces which control the radial movement of bushes 9 with respect to the shaft (ie the forces produced by the disc spring stacks 16), and $\lambda_1$ and $\lambda_2$ representing the effects of the gas films between the bushes 8 and 9 of the respective radial bearings. Similarly, the non-rotating part of the thrust bearing is represented (item th) with the gas film effect between it and the rotating part of this bearing (ie flange 24) and the effect of the disc spring stacks 37 represented as spring elements.

Seven motions are taken into account as follows:
$x_R$ translational motion of the rotor centre of gravity
$\theta_R$ conical motion of the rotor about the centre of gravity
$x_{B1}$ translational motion of the left-hand bush LHB
$\theta_{B1}$ conical motion of the left hand bush LHB
$x_{B2}$ translational motion of the right hand bush RHB
$\theta_{B2}$ conical motion of the right hand bush RHB
$\theta_{th}$ conical motion of the thrust bearing
The following nomenclature will be used herein:
c radial clearance,
H compressibility number, $$H = \frac{6\mu \, wR^2}{pa \, c^2}$$

Figure 5:
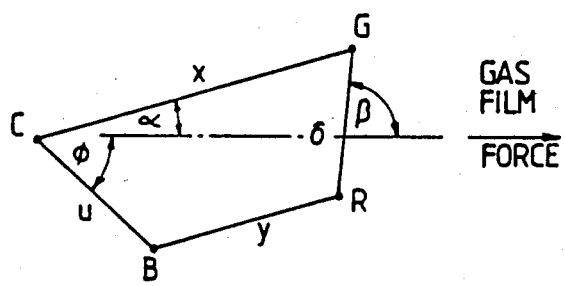

$I_P$ polar inertia,
$I_T$ transverse inertia,
k stiffness,
$l_1$ distance of LH bush from C of G,
$l_2$ distance of RH bush from C of G,
L bearing length,
m mass.
p distance of pivot position from C of G, (see FIG. 6)
pa ambient pressure,
R radius,
S mounting stiffness,
u distance CB in FIG. 5,
w shaft speed
x distance CG in FIG. 5,
y distance BR in FIG. 5,
$\alpha$ angle, FIG. 5,
$\beta$ angle, FIG. 5,
$\gamma$ ratio x/y
$\delta$ offset of C of G,
$\epsilon$ eccentricity ratio,
$\theta$ angle, $\theta = \beta - \alpha$
i angle between principal axis and rotor geometric axis,
$\lambda$ dynamic film stiffness at whirl onset,
$\mu$ viscosity,
$\phi$ attitude angle,
$\theta'$ angle between PG and rotor axis, FIG. 6,
$\xi$ angle between PG and machine axis,
$\xi_R$ angle between rotor axis and machine axis,
$\xi_B$ angle between bearing axis and machine axis,
$\xi_{th}$ angle of tilt of thrust bearing.

SUBSCRIPTS 1 left hand bearing,
2 right hand bearing,
B bush,
C conical,
P polar,
R rotor
T transverse (for inertia) or translational (for motion),
th thrust.

Definition of steady state whirl onset conditions is part of the established science of bearing design, see for example 'Mechanical Engineering Science Monograph No. 2' published by the Institution of Mechanical Engineers, London, June 1965. By use of such knowledge and a consideration of FIG. 4, there can be written the governing equations of motion defining the whirl onset speed of a system as follows:

1. Translational equation of motion for the rotor where $S_{1T}$ and $S_{2T}$ are the translational stiffnesses of the flexible members for the LH and RH bushes respectively.

2. Conical motion of the rotor $$-I_{TR}\theta_R w^2 = S_{1T}l_1(x_R - l_1\theta_R - x_{B1}) - S_{2T}l_2(x_R + l_2\theta_R - x_{B2}) - S_{1c}(\theta_R - \theta_{B1}) - S_{2c}(\theta_R - \theta_{B2}) - \lambda_{thc}(\theta_R - \theta_{th})$$

where $S_{1c}$ and $S_{2c}$ are the conical tilt stiffness of the LH and RH flexible members and $\lambda_{thc}$ is the tilt stiffness of the gas film in the thrust bearing. The effect of gyroscopic terms can be included by substituting ($I_{TR} - 2I_{PR}$) in place of $I_{TR}$, this being a simple approximation when dealing with conical half speed whirl.

3. Translational motion of the LH bush $$-m_{B1}x_{B1}w_\xi^2 = S_{IT}(x_R - l_1\theta_1 - x_{B1}) - \lambda_{IT}x_{B1}$$

where $\lambda_{IT}$ is the translational dynamic stiffness of the gas film which supports the LH bush.

4. Conical motion of the LH bush $$-I_{TB1}\theta_{B1}w_\xi^2 = S_{1c}(\theta_R - \theta_{B1}) - \lambda_{1c}\theta_{B1}$$

where $\lambda_{1c}$ is the conical dynamic tilt stiffness of the gas film which supports the LH bush. Since the bush is a rotating member, there are gyroscopic effects and these can be included by writing ($I_{TB1} - 2I_{PB1}$) in place of $I_{TB1}$.

5. Translational motion of the RH bush $$-m_{B2}x_{B2}w_\xi^2 = S_{2T}(x_R + l_2\theta_R - x_{B2}) - \lambda_{2T}x_{B2}$$

where $\lambda_{2T}$ is the translational dynamic stiffness of the RH gas film.

6. Conical motion of the RH bush $$-I_{TB2}\theta_{B2}w_\xi^2 = S_{2c}(\theta_R - \theta_{B2}) - \lambda_{2c}\theta_{B2}$$

where $\lambda_{2c}$ is the conical dynamic stiffness of the RH gas film. The gyroscopic effects are included by writing ($I_{TB2}Y - 2I_{PB2}$) in place of $I_{TB2}$.

7. Conical motion of the thrust bearing $$-I_{Tth}\theta_{th}w_\xi^2 = \lambda_{thc}(\theta_R - \theta_{th}) - S_{thc}\theta_{th}$$

where $S_{thc}$ is the tilt stiffness of the thrust bearing mounting. For solution these seven governing equations are brought together as a matrix equation.

$$[D] \times \begin{bmatrix} x_R \\ \theta_R \\ x_{B1} \\ \theta_{B1} \\ x_{B2} \\ \theta_{B2} \\ \theta_{th} \end{bmatrix} = 0$$

and the seven governing equations of motion define
(a) translational motion of the rotor
(b) conical motion of the rotor
(c) translational motion of the first bearing rotating bush
(d) conical motion of the first bearing rotating bush
(e) translational motion of the second bearing rotating bush
(f) conical motion of the second bearing rotating bush
(g) conical motion of the thrust bearing.

In the case of a rigid rotor with a single flexibly mounted bush and a single gas film, we may state that since the centre of gravity, G, is offset from the rotor geometric axis, R, by a small distance, $\delta$, the steady state orientation with respect to other parameters is as shown in FIG. 5 where the machine axis is taken as C, a fixed point in FIG. 5; the bush centre is B and where, if the rotating synchronous out of balance load creating the displacement δ is the only loading present, the effect of the out of balance is to cause the points C, B, R and G to take up a set certain geometry, which rotates synchronously about point C with the gas film force leading the line of centres by an angle $\phi$.

The problem requiring solution is to determine typically the shape of the quadrilateral CBRG for any operating condition of a real system.

In FIG. 5 the rotor centre of gravity is rotating at a radius CB so that there is an outward force on the rotor, outward force = $M_R . CG . w^2 = M_R . x . w^2$ This outward force in the rotor is balanced by the inward spring force exerted by the flexible member, inward spring force = $S . RB = S . y$ Since under steady state conditions these two forces are the only forces acting on the rotor, they must be equal, $M_R . x . w^2 = S . y$ and they must be parallel.

For the bush, there are three steady state forces
(a) the spring force S.y in the direction BR
(b) an outward force $M_B . CB . w^2 = M_B . u . w^2$
(c) the film force k.u from the gas film where to a good approximation the gas film coefficient, k, and the gas force attitude angle are given by $$\text{Tan } \alpha = \frac{M_B \cdot w^2 \cdot \text{Sin } \phi}{k - M_B \cdot w^2 \cdot \cos \phi}$$

Footnote: when $k > M_B \cdot w^2 \cdot \cos \phi$, α lies in the range 0 to 90°, while for $k < M_B \cdot w^2 \cdot \cos \phi$, then α lies in the range 90° to 180°.

From the steady state geometry depicted in FIG. 5 it also follows that:

$$\text{Tan } \beta = \frac{(x - y) \text{Sin } \alpha + u \sin \phi}{(x - y) \text{Cos } \alpha - u \text{Cos } \phi}$$

where $y = \frac{M_B w^2}{S} \cdot \frac{\text{Sin } \phi}{\text{Sin } \alpha} \cdot u$ and $x = \frac{M_B}{M_R} \cdot \frac{\text{Sin } \phi}{\text{Sin } \alpha} \cdot u$ These equations are sufficient to permit an interactive determination of the space diagram layout of a bearing bush in a real system.

For a symmetrical system where the rotor is supported in two identical flexibly mounted bearing bushes exact solutions can also be found.

These exact solutions arise when the geometrical conditions can be written as:

$$\delta \text{ Sin } \beta = \left[ 1 - \frac{M_B w^2}{S} + \frac{M_B}{M_R} \right] u \text{ Sin } \phi$$

and $$\delta \text{ Cos } \beta = - \left[ 1 - \frac{M_B w^2}{S} + \frac{M_B}{M_R} \right] u \text{ Cos } \phi - \left[ 1 - \frac{S}{M_R w^2} \right] \left[ \frac{K_o}{1 - \epsilon^2} \right] \cdot \frac{u}{S}$$

where $k_o$ is the stiffness of the gas film at very low eccentricity ratios.

In the first of these exact solutions:

CG = RG and BR = CG in FIG. 5.

and the eccentricity within the gas film is given by:

$\epsilon = \delta/C$

In a second exact solution $$w^2 = \frac{S \cdot (M_R + M_B)}{M_R \cdot M_B}$$

and the gas film force =

$$S \cdot \delta \cdot \left[ \frac{M_R + M_B}{M_R} \right]$$

$\approx S \cdot \delta$ for $M_B << M_R$

In a real two-bearing non-symmetrical system the principal axis through the centre of gravity is inclined at an angle i to the ZZ axis where $i = 2 I_{yz}/I_{yy} I_{zz}$ and this intersects the rotor geometric axis at a distance q from the centre of gravity where $q = -(\delta_T/i)$ and $\delta_T$ is the offset of the rotor centre of gravity.

This point of intersection of the inclined axis to the principal axis is important when considering operation at very high speed since the rotor will in the limit then tend to pivot about this point of intersection and spin about the principal axis.

The mathematical model for the general case of a rotor with in-phase out-of-balance components and two flexibly mounted bushes is shown in FIG. 6 while FIG. 7 shows a space diagram for one of the bearing bushes of FIG. 6. In FIG. 6:

$C_1 C_2$ is the fixed axis of the machine
$R_1 R_2$ is the geometric axis of the rotor
G is the centre of gravity, and
P is the point about which the conical motion of the rotor is taking place.

The point P lies on the machine axis $C_1 C_2$ but it also lies in the plane containing the rotor axis and the centre of gravity G.

The bush centres lie at $B_1$ and $B_2$ and the line PG intersects the bearing planes at $G_1$ and $G_2$. Under the above constraints the lines $R_1 G_1$ and $R_2 G_2$ are parallel and both lie in the plane defined by the lines $R_1 R_2$ and PG. In the bearing plane, the lines $C_1 G_1$ and $B_1 R_1$ are parallel, and the lines $C_2 G_2$ and $B_2 R_2$ are parallel. The angles $C_1 \hat{G}_1 R_1$ and $C_2 \hat{G}_2 R_2$ are equal.

Under the above constraints the single bearing governing equations previously discussed can be expanded to cover conical conditions yielding, in mildly assymetric designs.

$I_{yz'} \cdot w^2 = S_{1T} \cdot y_1 \cdot (p - l_1) + S_{2T} \cdot y_2 \cdot (p + l_2) +$ $\cos \psi \{ S_{1C}(\xi_R - \xi_{B1}) + S_{2C}(\xi_R - \xi_{B2}) + k_{th}(\xi_R - \xi_{th}) \}$ where $I_{y'z'}$ is the product of inertia at P for axis Z' lying along the machine axis and Y' normal to Z' and lying on the plane formed by PG and the machine axis.

($p-l_1$) is the distance from point P to bearing plane 1

($p+l_2$) is the distance from point P to bearing plane 2

$$\cos \psi = a/\sqrt{a^2 + b^2}$$

where $a = \cos \theta' \cdot \sin \xi - \sin \theta' \cdot \cos \xi \cdot \cos \theta$ $b = \sin \theta \cdot \sin \theta'$, and $\theta = (\beta_1 - \alpha_1) = (\beta_2 = \alpha_2)$ $S_c$ is the tilt stiffness of the bearing bush mounting and ($\xi_R - \xi_B$) represents its rotation relative to the rotor geometric axis.

$k_{th}$ represents the tilt stiffness of the thrust bearing mounting and ($\xi_R - \xi_{th}$) represents its rotation relative to the rotor geometric axis.

More complex forms of the above equations can also be written to represent extreme asymmetry conditions and phasing between the component parts of a system's out-of-balance.

As stated previously these governing equations are sufficient to permit an interactive determination of the space diagram layout of the bearing bushes under prescribed conditions.

The experimentally determined criterion of whirl suppression is that, due to out-of-balance, synchronous orbital motions of the rotating bush members need to be of similar magnitude to the steady-state fluid-film eccentricity which will exist at the onset of self excited instability (half speed whirl). When the criterion is applied to the turbo-compressor unit with flexible mounted rotating bearing bushes it is necessary to consider the effect of bush dilation. The operating clearance is a function of speed. The gas film behaviour is determined by the operating clearance and it is not influenced by the manner by which the system has reached the operating clearance. The criterion for the suppression of half speed whirl and the response to the out-of-balance both relate to the current value of the clearance. The criterion for whirl suppression is related to the current operating clearance and to the behaviour when this is also the clearance at the onset of half speed whirl. In effect, it is necessary to calculate the whirl onset speed and eccentricity for a system where there is no dilation and a radial clearance equal to the current operating value. The criterion for the cessation of half speed whirl is then:

the out-of-balance is sufficient to produce a synchronous orbital motion of the bush with a magnitude equal to the eccentricity at the onset of half speed whirl in a system where the clearance at the whirl onset is equal to the current value of the operating clearance.

Figure 8:
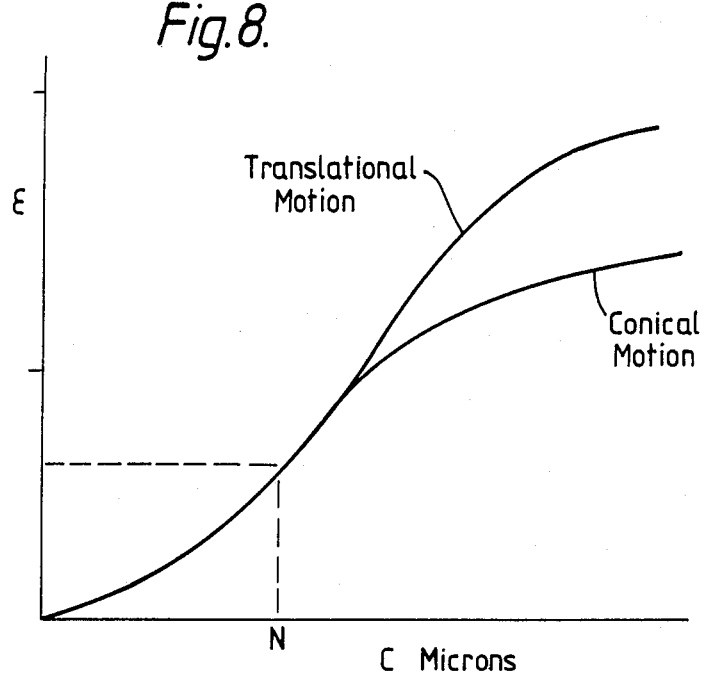

Making use of the mathematics set out earlier, for a particular structure there could be determined a curve illustrating eccentricity ratio as a function of clearance at the whirl onset, such a curve might appear something like that shown in FIG. 8.

The criterion for whirl cessation can be applied in the following way:

1. if the operating clearance at a particular speed S is N microns, then the half speed whirl will be suppressed if the out-of-balance produces a synchronous orbit with a radius greater than the eccentricity in a system which has a clearance of N microns at the whirl onset, 2. from FIG. 8, if the radial clearance at whirl onset is N microns, then the corresponding eccentricity ratio is ER.

3. the half speed whirl will be suppressed at speed S if the out-of-balance produces a synchronous orbit with an eccentricity ratio greater than ER.

For any speed, the operating clearance can be calculated and by reference to a curve such as that of FIG. 8, the minimum eccentricity ratio for whirl suppression is obtained.

Figure 9:
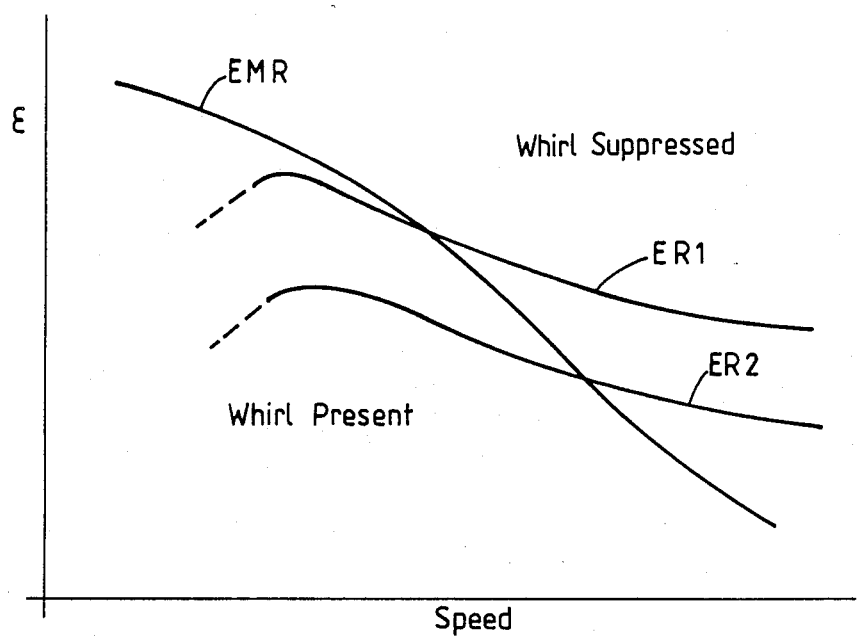

FIG. 9 is a plot of the minimum eccentricity ratio EMR for one bearing bush as a function of speed for a particular design of the FIG. 1 system, in particular where the initial radial clearance has a particular value. Also plotted in FIG. 9 is the variation of the eccentricity ratio ER1 and ER2 with speed for two levels of out-of-balance of the rotary system. The whirl is suppressed when the out-of-balance produces a synchronous orbital motion with an eccentricity ratio greater than that at whirl onset with the same clearance, ie when the relevant curve ER1 and ER2 goes above the EMR plot. With increasing out-of-balance, the whirl suppression takes place at lower speed. It can also be shown that the use of out-of-balance for whirl suppression is more effective when the radial clearance is small. Naturally, of course, the design of the system particularly the degree of out-of-balance relative to the radial clearance in the bearings should not be such that at any operating speed the synchronous orbital motion due to out-of-balance has an amplitude which is such as to bring the fixed and rotating bushes into actual contact with one another.

The desired degree of out-of-balance of the rotary system can be introduced by any desired means, for example by appropriately machining away of portions of the system or by adding mass at discrete positions thereon, eg by securing weights to the shaft. By way of example only, FIG. 1 shows how holes 100 could be drilled at appropriate places in part 22 to achieve the desired balance condition and how a small mass 101 could be attached to part 23 for a like purpose. A combination of added masses and drilled holes could be used or only one method can be used on both or either part 22 or 23 all as desired.

We claim:

1. An assembly of a support bearing member, and a rotary system including a rotor and a rotary bearing member, the support and rotary bearing members constituting a fluid-film journal bearing for radially locating the rotor and the rotary bearing member being mounted to rotate with the rotor but with circumferentially spaced adjustable means for creating resiliently controlled radial play relative to the rotor so that there is a tendency, if rotor whirl sets in, for the relative radial positions of the rotor and rotary bearing member and hence also the dynamic balance of the rotary system to alter, the assembly being such that said tendency results in the generating of force components which act upon said system to inhibit growth of said rotor whirl.

2. An assembly of a support bearing member, and a rotary system including a rotor and a rotary bearing member, the support and rotary bearing members constituting a fluid-film journal bearing for radially locating the rotor, characterised in that:

said rotary bearing member is mounted to rotate with the rotor but with circumferentially spaced adjustable means for creating resiliently controlled radial play relative to the rotor and said rotary system incorporates a sufficient degree of dynamic imbalance such that, during rotation of the rotor, said rotary bearing member undergoes a synchronous orbital motion which, at rotational speeds where self-excited rotor instability would otherwise set in, has a magnitude sufficient to suppress said instability.

3. An assembly comprising:

a fixed member;

a rotary system including a rotor supported for rotation with respect to the fixed member by way of two or more spaced fluid-film journal bearings, at least one of the bearings incorporating a bush which is mounted to the rotor for rotation therewith but with circumferentially spaced adjustable means for creating resiliently controlled play relative to the rotor, said rotary system being dynamically unbalanced to an extent such that, during rotation of the rotor, the bushes undergo a synchronous orbital motion of a magnitude sufficient to prevent the onset of self-excited instability of the rotary system at least over a chosen speed range.

4. An assembly of supported bearing members and a rotary system including a rotor and rotary bearing members, the support and rotary bearing members constituting fluid-film journal bearings for radially locating the rotor and the rotary bearing members being mounted to rotate with the rotor but with circumferentially spaced adjustable means for creating resiliently controlled radial play relative to the rotor such that the state of the rotor, due to out-of-balance, is of sufficient amount to substantially produce synchronous orbital motions of the rotating bearing members which on the basis of experimental evidence is then of a magnitude equal to at least the fluid-film eccentricity at the onset of self-excited instabilities, each of which is known as half-speed whirl, wherein also in each bearing assembly the relevant mean fluid-film thickness is the current value of operating clearance.

5. An assembly according to claim 3 or 4, wherein the out-of-balance state of the rotary system is greater than said sufficient amount but less than that at which, at each bearing plane, the principal axis of the rotor is displaced from the system geometric axis by a distance which is less than the current value of operating clearance in the relevant bearing.

* * * * *